United States Patent
Lin

(10) Patent No.: US 7,284,251 B2
(45) Date of Patent: Oct. 16, 2007

(54) DISC-GUIDING MEMBER PROVIDED WITH A POSITIONING PILLAR

(75) Inventor: Jui-Chiang Lin, Hsinchu (TW)

(73) Assignee: Lite-On It Corporation, Taipei (TW)

( * ) Notice: Subject to any disclaimer, the term of this patent is extended or adjusted under 35 U.S.C. 154(b) by 414 days.

(21) Appl. No.: 10/957,656

(22) Filed: Oct. 5, 2004

(65) Prior Publication Data

US 2005/0076350 A1    Apr. 7, 2005

(30) Foreign Application Priority Data

Oct. 6, 2003    (TW) .............................. 92127714 A

(51) Int. Cl.
*G11B 17/04*    (2006.01)
(52) U.S. Cl. ................................... 720/623
(58) Field of Classification Search ........ 720/622–623, 720/704
See application file for complete search history.

(56) References Cited

U.S. PATENT DOCUMENTS 6,636,470 B1 * 10/2003 Sasada et al. ................ 720/622
6,941,565 B2 * 9/2005 Huang et al. ................ 720/623

* cited by examiner

*Primary Examiner*—A. J. Heinz
(74) *Attorney, Agent, or Firm*—Ming Chow; Sinorica, LLC

(57) ABSTRACT

A disc drive includes a disc-guiding member provided with a positioning pillar, a rotating seat for receiving an optical disc when the disc is disposed at a reading position, and a transport roller for pushing the optical disc against urging action of the disc-guiding member to a temporary position above the reading position. The pillar has an enlarged first portion to contact the disc when the disc is at the temporary position and a constricted second portion to space apart from the disc when the disc is at the reading position.

15 Claims, 10 Drawing Sheets

DISC-GUIDING MEMBER PROVIDED WITH A POSITIONING PILLAR

This Nonprovisional application claims priority under 35 U.S.C. § 119(a) on Patent Application No(s). 092127714 filed in Taiwan, Republic of China on Oct. 6, 2003, the entire contents of which are hereby incorporated by reference.

FIELD OF THE INVENTION

The invention relates to a disc drive, more particularly to a disc drive of slot-in type having a disc-guiding member provided with a positioning pillar to enhance the precision of positioning an optical disc to a reading position.

BACKGROUND OF THE INVENTION

Among all the data storage solutions, the optical discs are becoming more and more important for backing up data and exchanging information because the optical storage media have many advantages including a high storage capacity, easy to handle, and a long preserving time for the stored data. The optical disc drive also becomes more popular for this reason, and there are many types of the optical disc drive being provided for different users such as H/H type, slim type, slot-in type, and so on. Till now, the optical disc drive of slot-in type can be found all around such as notebook or laptop computers, DVD players, and even some instruments or electronic products with built-in microprocessors.

Referring to FIGS. 1 to 3 partly exploded and bottom views of a conventional disc drive of slot-in type are shown. The conventional disc drive includes a casing (not visible) having a front wall formed with a disc entrance-and-exit slot 10, a mounting frame 1 enclosed by the casing, a disc transport mechanism disposed in the casing adjacent to the entrance-and-exit slot 10 and mounted on the frame 1, and four positioning pillars 1a, 1b, 1c, 1d. The disc transport mechanism 6 includes a transport roller 6 journal led movably on the mounting frame 1, a pair of front disc-guiding members 101 disposed adjacent to the entrance-and-exit slot 10, and a pair of rear disc-guiding members 102 disposed distal from the entrance-and-exit slot 10. Each of the positioning pillars 1a, 1b, 1c, and 1d is attached to a respective one of the disc-guiding members 101, 102. Upon detecting presence of an optical disc 9 near the entrance-and-exit slot 10 in the casing, the transport roller 6 is actuated to rotate in a first direction in such a manner to push due to applying force on the optical disc 9 inward via the entrance-and-exit slot 10 against biasing action of the disc-guiding members 101, 102. The periphery of the optical disc will abut and push the front and rear disc-guiding members 101, 102 to a temporary position within the casing. The disc 9 is retained temporarily at the temporary position and is later conveyed to a reading position, where the disc 9 is disposed securely onto a rotating seat 2 with the assistance of a clamp 4 (see FIG. 5). At the reading position, a gap "g" needs to be formed between the disc 9 and the positioning pillars 1a, 1b, 1c, 1d (see FIG. 6) to permit smooth rotation of the disc 9.

Note that, in the conventional disc drive, each of the pillars 1a, 1b, 1c, 1d has a uniform width throughout the axial length. In order to provide the gap "g" between the positioning pillars 1a, 1b, 1c, 1d and the disc 9 when the disc is moved to the reading position, it may sacrifice the precision of positioning an optical disc onto a rotating seat. Under this circumstance, when the disc 9 is moved to from an exterior of the casing into the temporary position, the periphery of the disc 9 may not be coaxial with the rotating seat 2 (see FIG. 2), which in turn can result in improper positioning of the disc 9 on the rotating seat 2 when the disc 9 is moved to the reading position from the temporary position.

SUMMARY OF THE INVENTION

The object of the present invention is to provide a disc drive of slot-in type having a disc-guiding member provided with a positioning pillar having a specific structure so as to enhance the precision of positioning an optical disc onto a rotating seat when the disc is moved from a temporary position onto the rotating seat to conduct a reading operation of the disc and avoid the interference between the positioning pillar and the optical disc when the optical disc rotates.

A disc drive of slot-in type according to the present invention includes: a casing having a front wall formed with an entrance-and-exit slot; a transport roller journal led within the casing adjacent to and extending along a length of the entrance-and-exit slot for drawing an optical disc via the entrance-and-exit slot into the casing to a temporary position prior to being moved to a reading position and/or ejecting the optical disc from the casing via the entrance-and-exit slot; a pair of front disc-guiding members disposed movably within the casing close to the entrance-and-exit slot and above the rotating seat; a pair of rear disc-guiding members disposed movably within the casing distal from the entrance-and-exit slot and disposed rearward of the front disc-guiding members respectively and above the rotating seat; and four positioning pillars attached respectively to the front and rear disc-guiding members. Each of the positioning pillars has an first portion that is attached to a respective one of the front and rear disc-guiding members and that abuts against the periphery of the optical disc to retain the disc at the temporary position, and a second portion that has a cross-section smaller than that of the first portion and that is spaced apart from the periphery of the optical disc when the disc is disposed at the reading position to permit rotation of the optical disc.

BRIEF DESCRIPTION OF THE DRAWINGS

Other features and advantages of this invention will become more apparent in the following detailed description of the preferred embodiments of this invention, with reference to the accompanying drawings, in which.

DETAILED DESCRIPTIONS OF THE PREFERRED EMBODIMENTS

Figure 1:
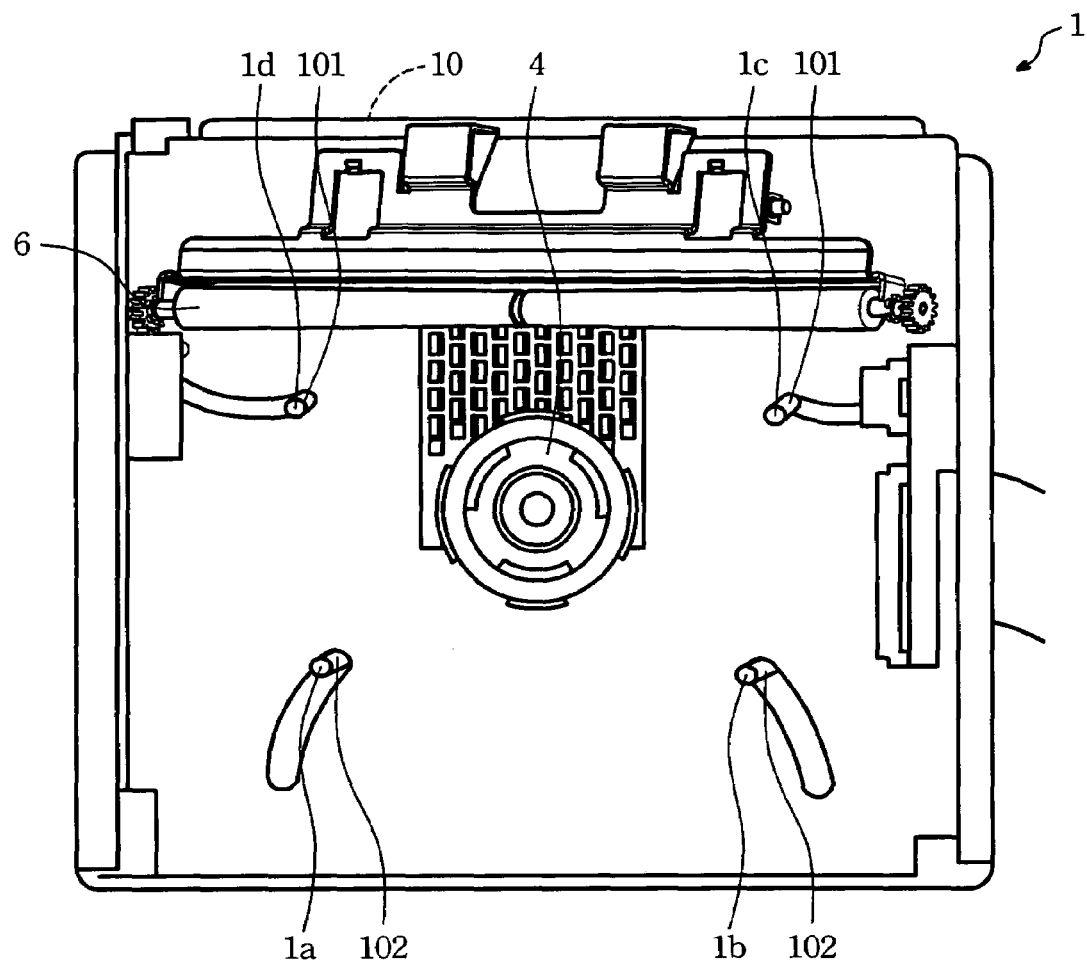
FIG. 1 shows a bottom view of a conventional disc drive of slot-in type with an outer casing removed therefrom.
Figure 2:
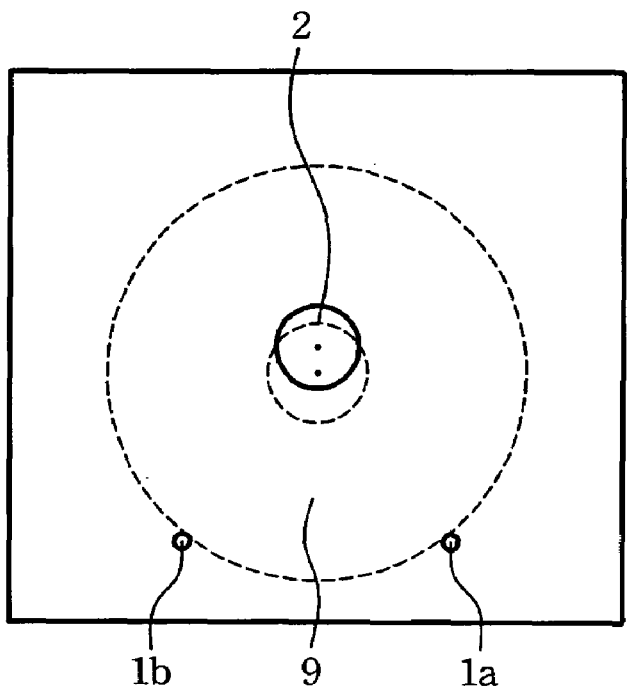
FIG. 2 is a partly exploded and bottom view, illustrating how an optical disc is retained at a temporary position in the conventional disc drive with the outer casing removed therefrom.
Figure 3:
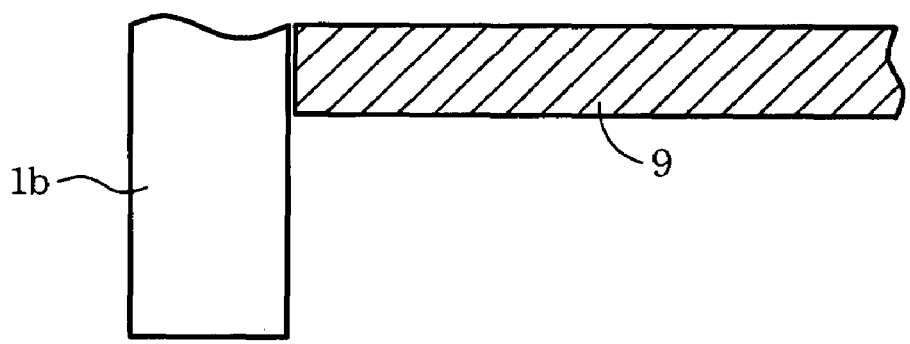
FIG. 3 is a fragmentary side view, illustrating how the optical disc is retained at the temporary position in the conventional disc drive with the outer casing removed therefrom.
Figure 4:
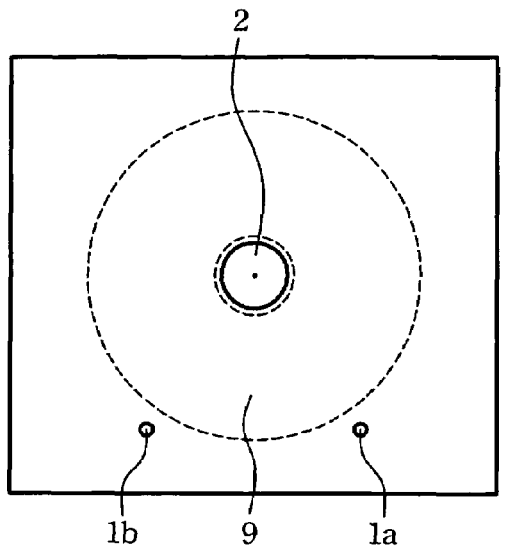
FIG. 4 is a partly exploded and bottom view, illustrating how the optical disc is retained at the temporary position in the conventional disc drive with the outer casing removed therefrom.
Figure 5:
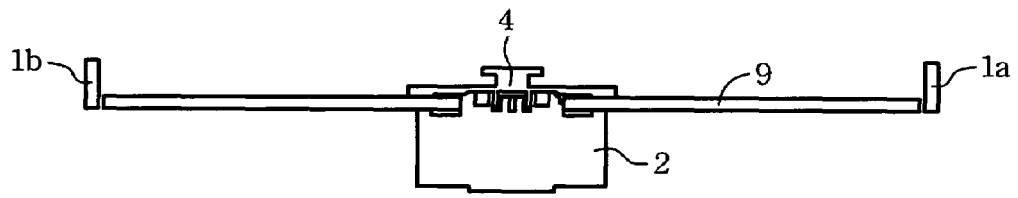
FIG. 5 is a partly exploded side view, illustrating how the optical disc is retained on a rotating seat at a reading position in the conventional disc drive with the outer casing removed therefrom.
Figure 6:
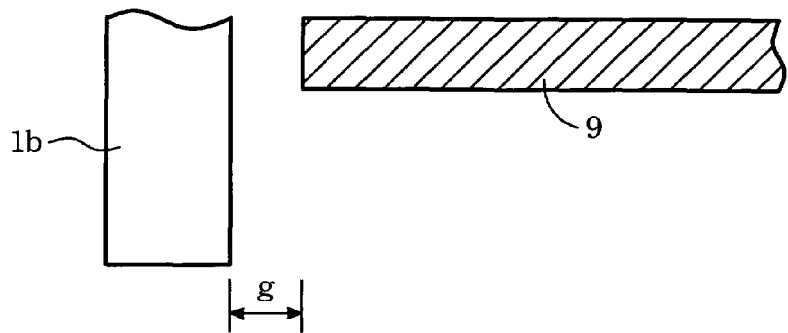
FIG. 6 is a fragmentary partly exploded view, illustrating how the optical disc is spaced apart from the positioning pillar of disc-guiding member of the conventional disc drive with the outer casing removed therefrom.
Figure 7:
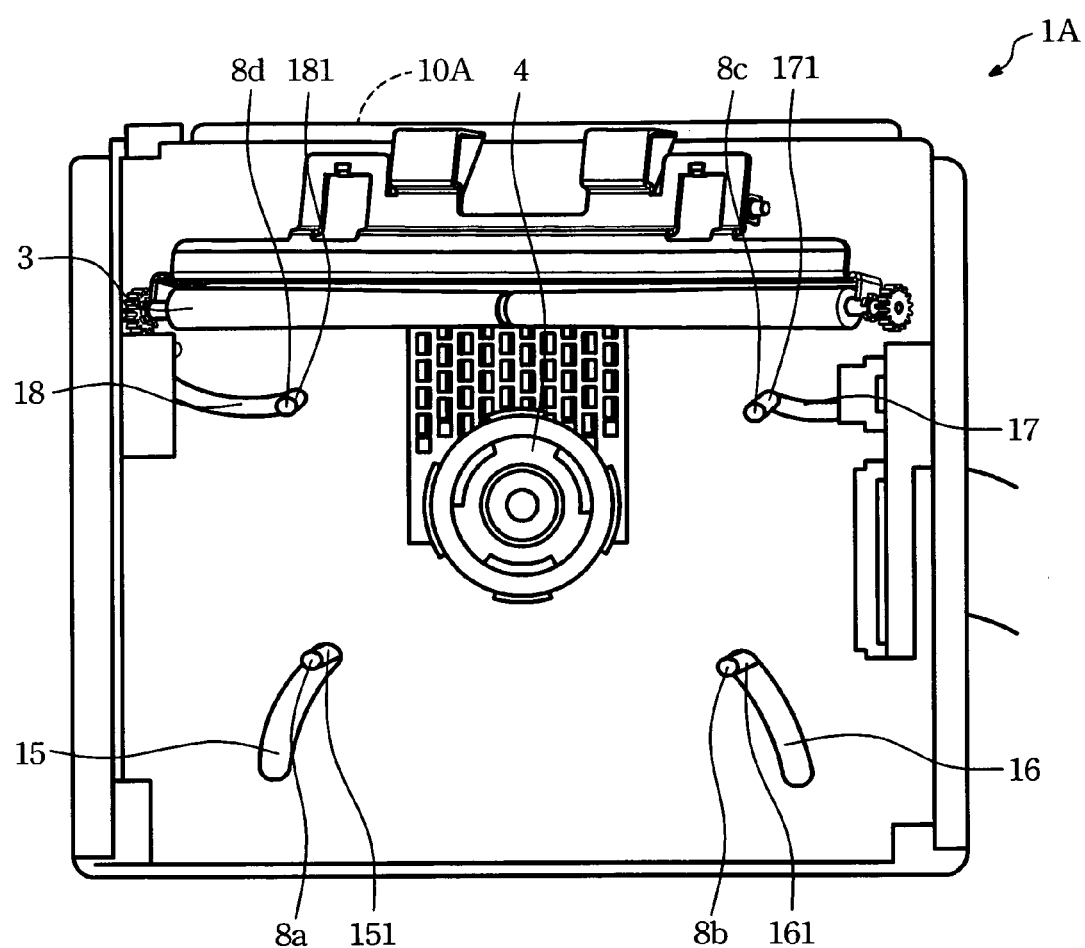
FIG. 7 is a partly exploded and bottom view of the preferred embodiment of a disc drive of slot-in type according to the present invention with an outer casing removed therefrom.
Figure 8:
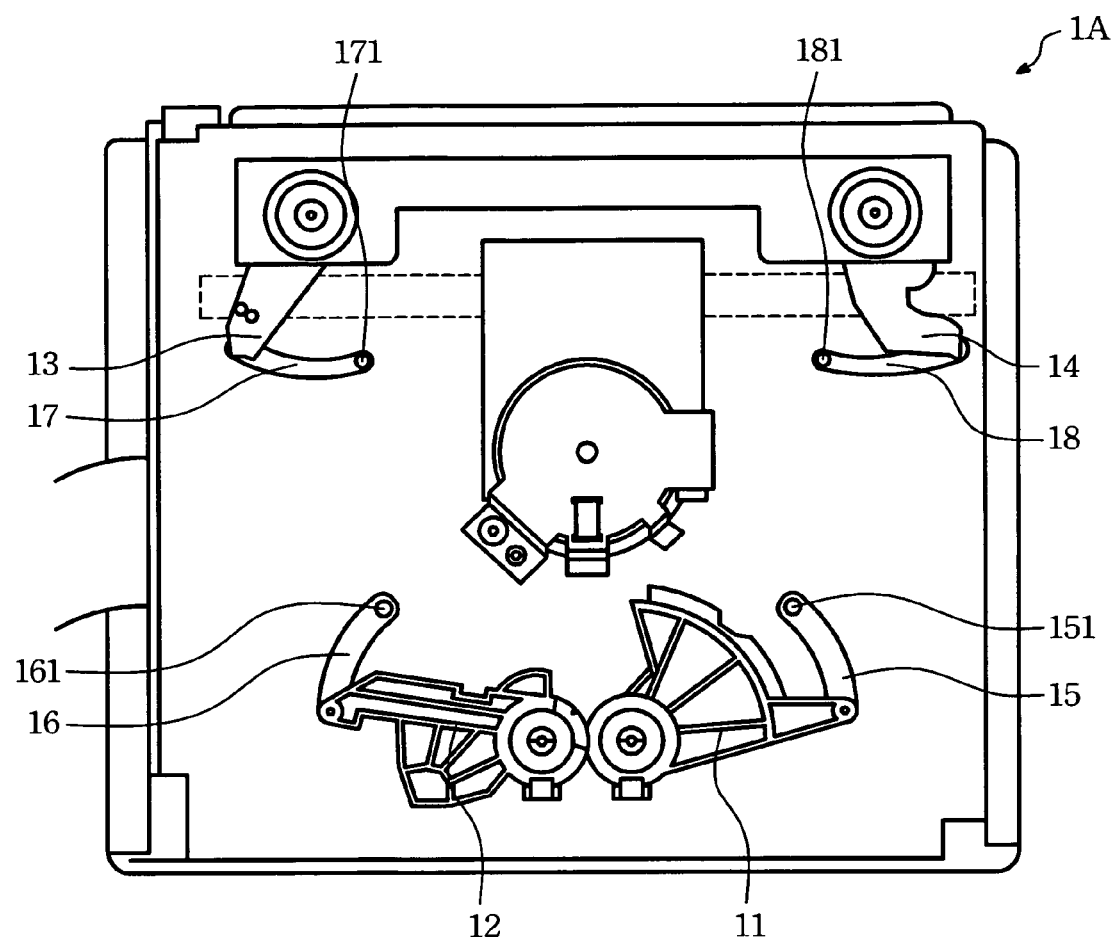
FIG. 8 is a partly exploded and top view of the preferred embodiment of the disc drive of slot-in type according to the present invention with the outer casing removed therefrom.

FIGS. 7 and 8 respectively show bottom and top views of the preferred embodiment of a disc drive of slot-in type with an outer casing removed therefrom. The preferred embodiment is generally installed in desktop computers, laptop computers, DVD players, or in an audio-and-video instrument for reproducing the information recorded in an optical disc, such as playing songs from a CD.

The preferred embodiment includes an outer casing (not visible since removed) having a front wall formed with an entrance-and-exit slot 10A, a mounting frame 1A enclosed by the outer casing, and a disc transport mechanism mounted on the frame 1A. The disc transport mechanism includes a transport roller 3 journal led movably on the frame 1A, at least a disc-guiding member, for example, in the preferred embodiment, there are four disc-guiding members including a pair of spring-biased front disc-guiding members 13, 14 mounted on the frame 1A and a pair of spring-biased rear disc-guiding members 11, 12 mounted on the frame 1A, front and rear pair of sliding grooves 17, 18, 15, 16 formed on the frame 1A, and at least a positioning pillar, for example, in the preferred embodiment, there are four positioning pillars 8a, 8b, 8c, 8d. Each of the positioning pillars 8a, 8b, 8c, 8d is integrally formed with a respective one of the front and rear disc-guiding members 11, 12, 13, 14 so as to slide along a respective one of the front and rear sliding grooves 15, 16, 17, 18. Since the structure of the disc-guiding members 14, 13, 12, 11 and the sliding grooves 18, 17, 16, 15 is not the relevant feature of the present invention, a detailed description thereof is omitted herein for the sake of brevity.

Figure 9:
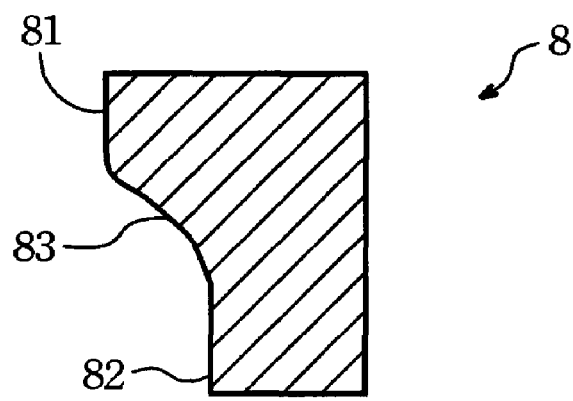
FIG. 9 is a schematic enlarged side view of a positioning pillar attached to the disc-guiding member of the disc drive according to the present invention.
Figure 10:
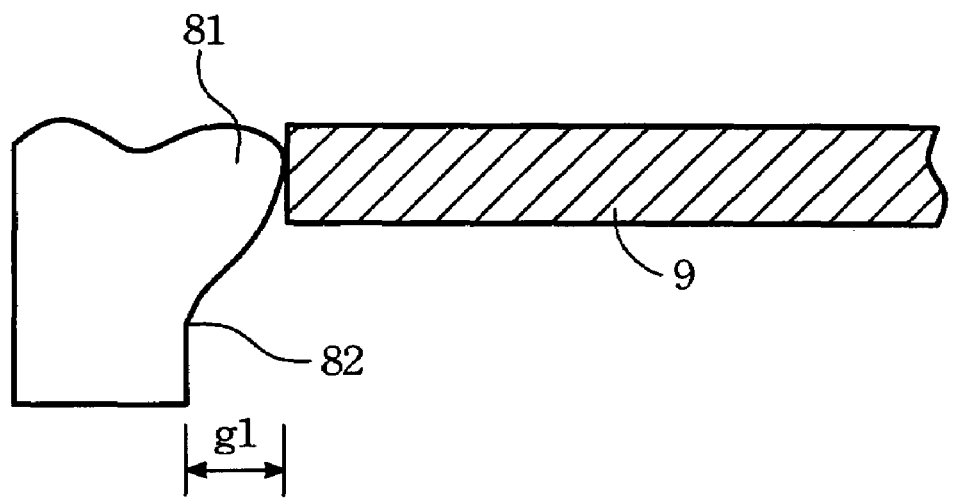
FIG. 10 is a schematic partly side view, illustrating how the disc is retained-at a temporary position by the positioning pillars shown in FIG. 9 of the disc drive according to the present invention.
Figure 11:
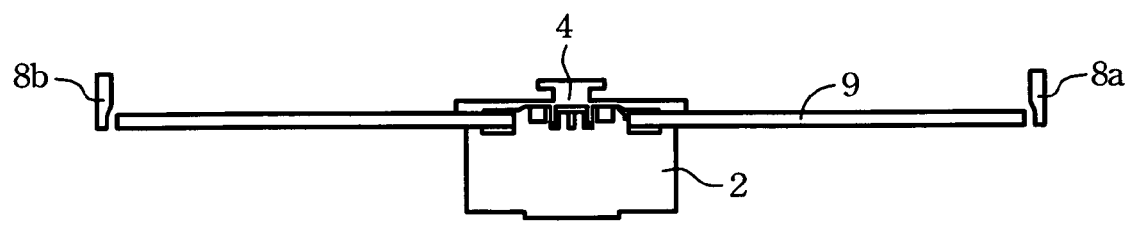
FIG. 11 is a schematic side view, illustrating how the positioning pillar is spaced apart from the disc when the disc is disposed at the reading position in the disc drive according to the present invention.
Figure 12:
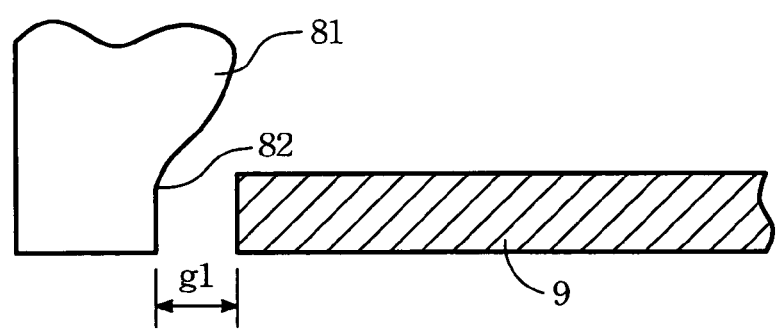
FIG. 12 is a fragmentary enlarged view of FIG. 11, illustrating how the positioning pillar is spaced apart from the disc when the disc is disposed at the reading position in the disc drive according to the present invention.

Referring to FIG. 9, each of the positioning pillars 8a, 8b, 8c, 8d has a first portion which is, for example, an upper portion 81 in the preferred embodiment and a second portion which is, for example, a lower portion 82 in the preferred embodiment that has a cross-section smaller than that of the upper portion 81, thereby defining a shoulder 83 between the upper and lower portions 81, 82. The shoulder 83 of each of the positioning pillars 8a, 8b, 8c, 8d gradually reduces from the upper portion 81 toward the lower portion 82. Upon detecting presence of an optical disc 9 near the entrance-and-exit slot 10A in the casing, the transport roller 3 is actuated to rotate in a first direction in such a manner to push due to applying force on the optical disc 9 inward via the entrance-and-exit slot 10A against biasing action of the front and rear disc-guiding members 14, 13, 12, 11. The periphery of the optical disc will abut and push the front and rear disc-guiding members 14, 13, 12, 11 to a temporary position within the casing, where the upper portions 81 of the positioning pillars 8a, 8b, 8c, 8d cooperatively confine the disc 9 there among upon the disc reaching the temporary position (sees FIGS. 10 and 13). At this state, a center of the disc 9 is vertically aligned with the center of a rotating seat 2 that is disposed at an elevation below the mounting frame 1A. The disc 9 is later conveyed to a reading position, where the disc 9 is disposed precisely onto the rotating seat 2 by virtue of co-axis relationship and is mounted securely on the seat 2 with the assistance of a clamp 4 (see FIG. 11) so as to prevent untimely removal of the disc 9 from the seat 2 during the reading operation. The movement of the disc 9 from the temporary position to the reading position on the seat 2, and how an optical pick-up head reads the information on the recording surface of the disc 9 are well known in the art. At the reading position, as shown in FIGS. 12 and 14, a gap "g1" will be formed between the disc 9 or 9A and the lower portions 82 of the positioning pillars 8a, 8b, 8c, 8d (only two of them are visible in FIG. 14) since the lower portion 82 has a cross section smaller than that of the upper portion 81. Thus, the disc 9 can rotate smoothly without being interfered by the positioning pillars 8a, 8b, 8c, and 8d. The positioning pillars 8a, 8b, 8c, 8d return to their initial positions (i.e. the forward ends of the sliding grooves 15, 16, 17, 18) by virtue of the forward biasing action when the optical disc 9 moves out of the disc drive.

Figure 15:
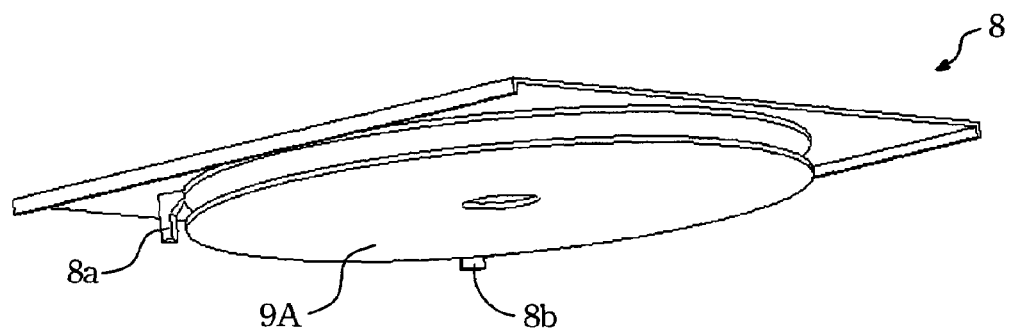
FIG. 15 is a partly exploded and bottom view, illustrating relationship between the disc of 12 cm and the positioning pillars when the former is disposed at the temporary position and the reading position in the disc drive according to the present invention with the outer casing removed therefrom.

FIG. 15 illustrates the disc 9A at the temporary and reading positions with respect to the positioning pillars 8*a*, 8*b*. Note that there is a vertical difference between the temporary position and the reading position. Since the lower portions 82 of the positioning pillars 8*a*, 8*b*, 8*c*, 8*d* have a cross section smaller than that of the upper portions 81, the disc 9A is spaced apart from the lower portions 82 of the positioning pillars 8*a*, 8*b* by the gap "g1". Thus, the disc 9A can rotate smoothly without being interfered by the positioning pillars 8*a*, 8*b*, 8*c*, and 8*d*.

Figure 13:
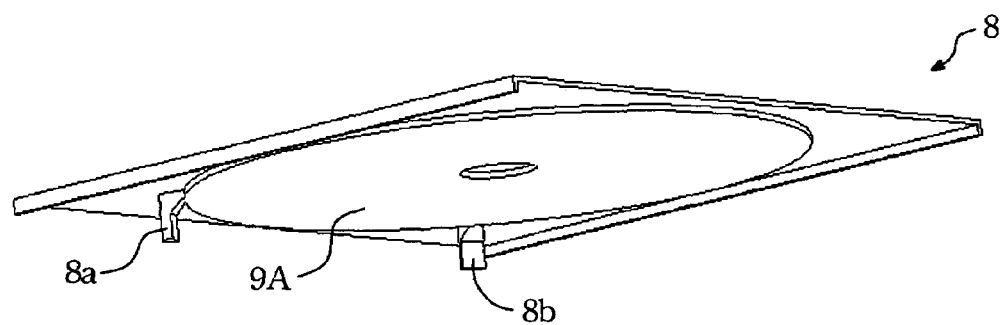
FIG. 13 is a partly exploded and bottom view, illustrating how the disc of 12 cm is retained at the temporary position by the positioning pillars shown in FIG. 9 of the disc drive according to the present invention with the outer casing removed therefrom.
Figure 14:
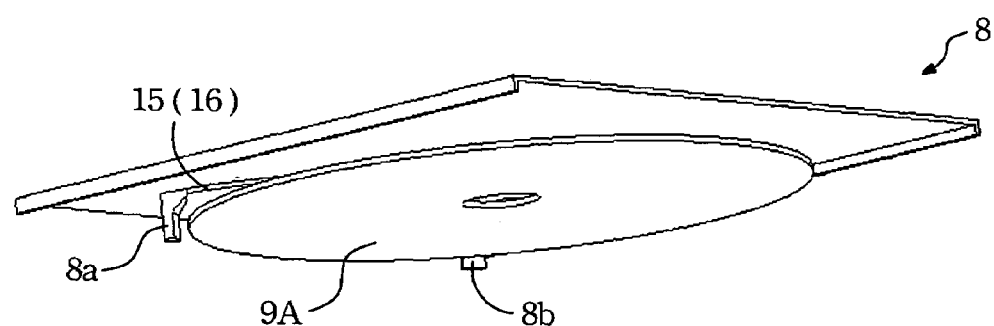
FIG. 14 is a partly exploded and bottom view, illustrating relationship between the disc of 12 cm and the positioning pillar when the former is disposed at the temporary position in the disc drive according to the present invention with the outer casing removed therefrom.
Figure 16:
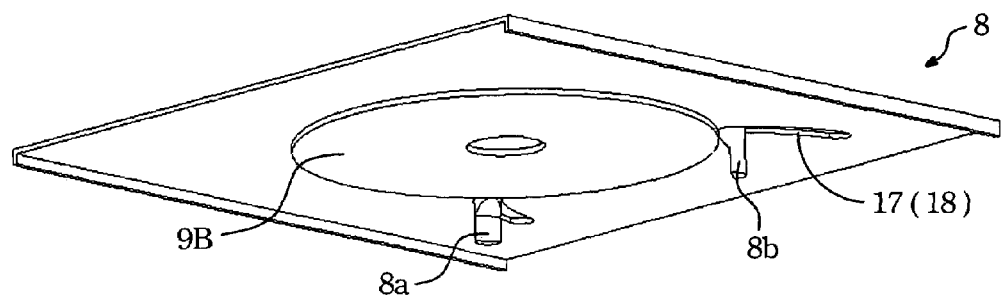
FIG. 16 is a partly exploded and bottom view, illustrating how the disc of 8 cm is retained at the temporary position by the positioning pillars shown in FIG. 9 of the disc drive according to the present invention with the outer casing removed therefrom.
Figure 17:
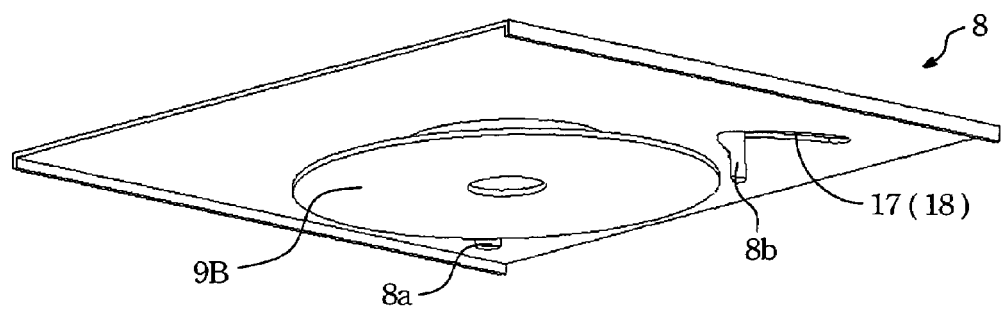
FIG. 17 is a partly exploded and bottom view, illustrating relationship between the disc of 8 cm and the positioning pillar when the former is disposed at the temporary position in the disc drive according to the present invention with the outer casing removed therefrom.
Figure 18:
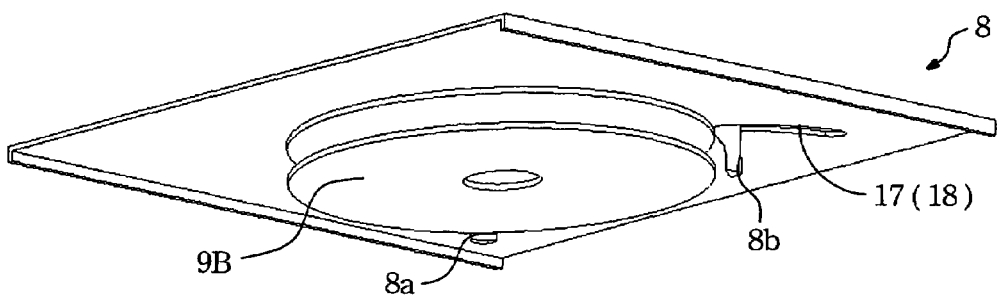
FIG. 18 is a partly exploded and bottom view, illustrating relationship between the disc of 8 cm and the positioning pillars when the former is disposed at the temporary position and the reading position in the disc drive according to the present invention.

FIGS. 16 and 17 respectively show the disc 9B at the temporary position and the reading position which are similar to FIGS. 13 and 14. The only difference resides in the disc 9B in FIGS. 16 and 17 has a diameter of 8 cm while the disc 9A in FIGS. 13 and 14 has a diameter of 12 cm. FIG. 18 illustrates the disc 9B at the temporary and reading positions with respect to the positioning pillars 8*a*, 8*b*. Note that there is a vertical difference between the temporary position and the reading position. Since the lower portions 82 of the positioning pillars 8*a*, 8*b*, 8*c*, 8*d* have a cross section smaller than that of the upper portions 81, the disc 9B is spaced apart from the lower portions 82 of the positioning pillars 8*a*, 8*b*, 8*c*, 8*d* by the gap "g1". Thus, the disc 9B can rotate smoothly without being interfered by the positioning pillars 8*a*, 8*b*, 8*c*, and 8*d*.

Figure 19:
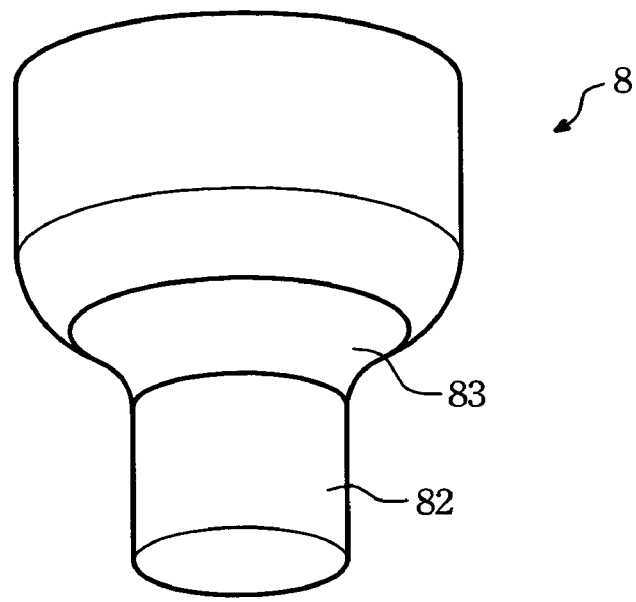
FIG. 19 is a perspective view of a modified positioning pillar employed in the disc drive according to the present invention.
Figure 20:
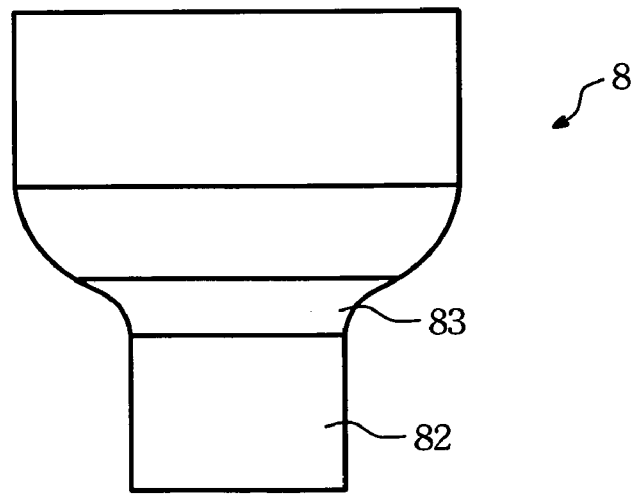
FIG. 20 is a schematic side view of the modified positioning pillar employed in the disc drive according to the present invention.

FIGS. 19 and 20 respectively show perspective and side views of a modified positioning pillar used in the preferred embodiment of the disc drive of the present invention. The modified positioning pillar 8 is cylindrical-shaped, and has a large-diameter upper portion 81, a smaller-diameter lower portion 82, and a shoulder 83 therebetween that gradually reduces from the upper portion 81 toward the lower portion 82.

When the disc-guiding member is provided with the positioning pillar used in the disc drive of the present invention, the disc can be disposed precisely and co-axially onto the rotating seat and the disc can rotate smoothly without being interfered by the positioning pillars.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A positioning pillar for attachment to a disc-guiding member of a disc drive that includes a casing having a front wall formed with an entrance-and-exit slot, the disc-guiding member being disposed movably within the casing for guiding an optical disc via the entrance-and-exit slot into the casing to a temporary position, where the optical disc is retained temporarily prior to being moved to a reading position right below the temporary position, the positioning pillar having a first portion that is adapted to abut against the periphery of the optical disc to retain the disc at the temporary position and a second portion that has a cross-section smaller than that of said first portion and that is adapted to be spaced apart from the periphery of the optical disc when the optical disc is disposed at the reading position to permit rotation of the optical disc.

2. The positioning pillar according to claim 1, wherein said first portion is an upper portion and said second portion is a lower portion.

3. A positioning pillar for attachment to a disc-guiding member of a disc drive that includes a casing having a front wall formed with an entrance-and-exit slot, the disc-guiding member being disposed movably within the casing for guiding an optical disc via the entrance-and-exit slot into the casing to a temporary position, where the optical disc is retained temporarily prior to being moved to a reading position right below the temporary position, the positioning pillar having an upper portion that is adapted to abut against the periphery of the optical disc so as to retain the disc at the temporary position and a lower portion that has a cross-section smaller than that of said upper portion, thereby defining a shoulder between said upper and lower portions, and said lower portion is adapted to he spaced apart from the periphery of the optical disc when the optical disc is disposed at the reading position to permit rotation of the optical disc.

4. A disc drive comprising:
 a casing having a front wall formed with an entrance-and-exit slot;
 a transport roller journaled within said casing for drawing an optical disc via said entrance-and-exit slot to a temporary position prior to being moved to a reading position and/or ejecting the optical disc from said casing via said entrance-and-exit slot;
 at least one disc-guiding member disposed movably within said casing; and
 at least one positioning pillar attached to said disc-guiding member in such a manner that said positioning pillar has a first portion that abuts against the periphery of the optical disc to retain the disc at said temporary position and a second portion that has a cross-section smaller than that of said first portion and that is spaced apart from the periphery of the optical disc when the disc is disposed at the reading position to permit rotation of the optical disc.

5. The disc drive according to claim 4, wherein said reading position is right below said temporary position.

6. The disc drive according to claim 4, wherein a shoulder is defined between said first and second portions.

7. The disc drive according to claim 4, wherein said first portion is an upper portion and said second portion is a lower portion.

8. The disc drive according to claim 4, wherein said first portion of said positioning pillar is integrally from with said disc-guiding members.

9. The disc drive according to claim 4, further comprising a rotating seat for rotating the optical disc when the disc is disposed at said reading position.

10. The disc drive according to claim 9, wherein when the optical disc is disposed at said temporary and reading positions, the optical disc and said rotating seat being disposed co-axially with respect to each other.

11. The disc drive according to claim 4, comprising a front pair of said disc-guiding members disposed movably within said casing proximate to said entrance-and-exit slot.

12. The disc drive according to claim 4, comprising a rear pair of said disc-guiding members disposed movably within said casing distal from said entrance-and-exit slot.

13. The disc drive according to claim 4, comprising four of said positioning pillars.

14. A disc drive comprising:
 an entrance-and-exit slot for receiving and rejecting an optical disc;
 a mounting frame;
 a plurality of disc-guiding members disposed movably on said mounting frame; and a plurality of positioning pillars attached respectively to said disc-guiding members;

wherein at least one of said positioning pillars has a first portion that is adapted to abut against the periphery of the optical disc to retain the same at a temporary position where the optical disc is retained temporarily prior to being moved to a reading position right below the temporary position, and a second portion that is adapted to be spaced apart from the periphery of the optical disc when the optical disc is disposed at the reading position, a cross-section of said second portion being smaller than that of said first portion.

15. The disc drive according to claim 14, wherein said positioning pillars are integrally from with said disc-guiding members respectively.

* * * * *